May 25, 1965 D. M. WHERRY 3,185,922
DEVICE FOR DETERMINING THE REPRODUCTION CHARACTERISTICS OF A MAGNETIC RECORDING MEDIUM
Filed Feb. 24, 1961
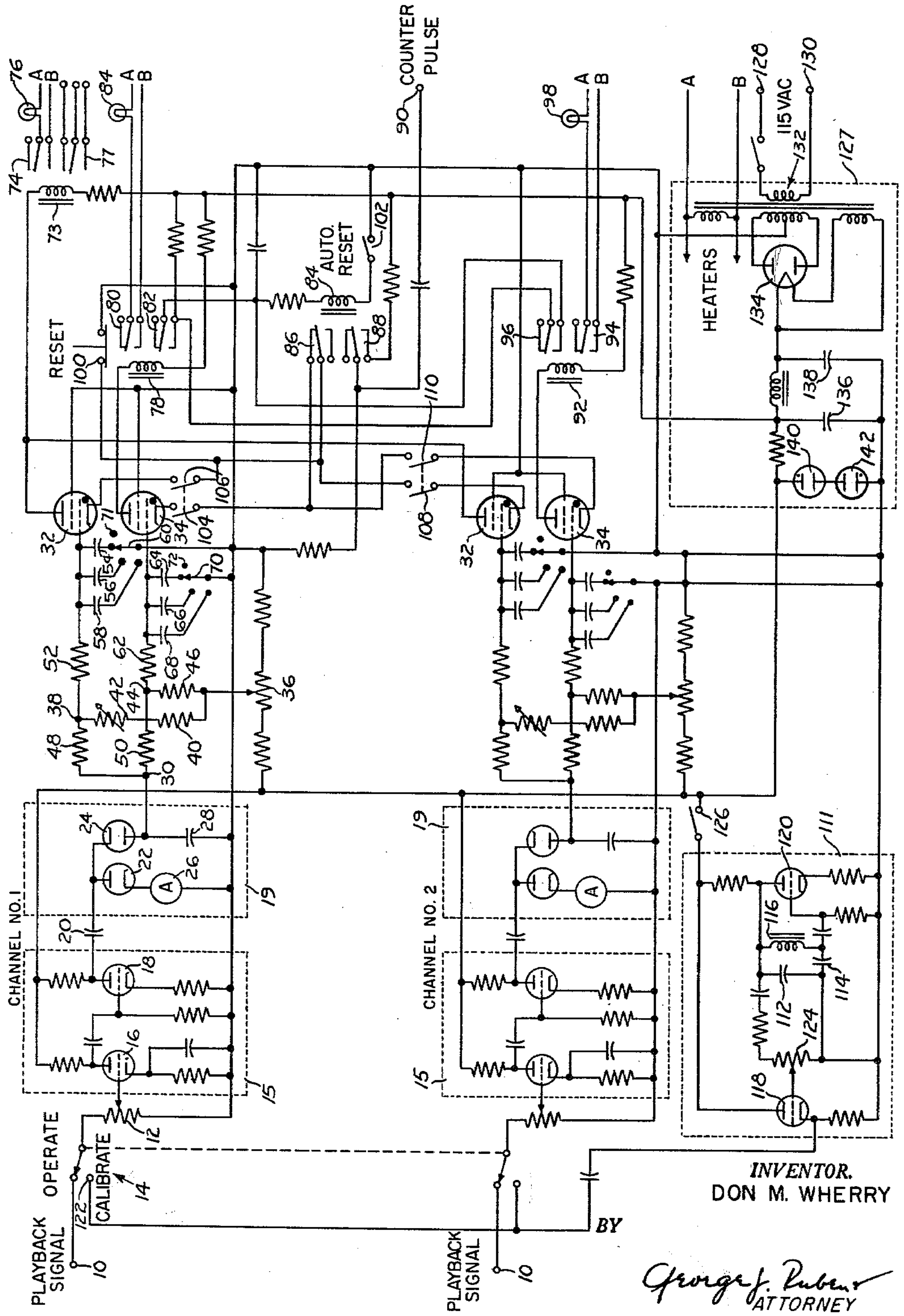
INVENTOR.
DON M. WHERRY
BY George J. Rubens
ATTORNEY 3,185,922
DEVICE FOR DETERMINING THE REPRODUCTION CHARACTERISTICS OF A MAGNETIC RECORDING MEDIUM

Don M. Wherry, 2121 Grandview Drive, Camarillo, Calif.
Filed Feb. 24, 1961, Ser. No. 91,554
1 Claim. (Cl. 324—34)
(Granted under Title 35, U.S. Code (1952), sec. 266)

The invention described herein may be manufactured and used by or for the Government of the United States of America for governmental purposes without the payment of any royalties thereon or therefor.

The present invention relates to a recording media quality tester and more particularly to a tester for detecting dropouts exceeding predetermined maximum depths and/or widths in a test signal played back from a magnetic recording media such as a tape.

The quality of magnetic recording media depends upon the uniformity of a thin layer of iron oxide which is deposited on one side of a base material such as a tape, band, disc, drum, etc. Nonuniformities in the layer of iron oxide on these media may be caused by defects in manufacture and wear from usage and will cause an output below a normal level. The reduction in output is usually referred to as a dropout and may vary from a small amount of a complete absence of signal. The maximum allowable dropout of signal in depth and/or width of course depends upon the requirements of the data being recorded. In instrumentation recording of data the media often must meet two standards with respect to dropouts, namely, (1) a dropout not exceeding a maximum depth and a specified width and (2) a dropout not exceeding a maximum width and a specified depth. There is no known device for satisfying such a requirement. Former devices for testing such media have employed recording meters, electronic counters, etc. These devices record an alternating voltage on the media through the normal recording mechanism of the media recorder and then examine by various means the playback output, thus indicating the condition of the oxide layer. The disadvantages of these devices are (1) they are too slow to accurately respond to oxide dropouts involved in most instrumentation recording of data, (2) the equipment required is complicated and costly, and (3) they will not determine dropouts having a plurality of specified depths and widths.

The present invention overcomes the above disadvantages by providing a device which examines a test playback signal in a unique manner. The playback signal is amplified, rectified and the resultant voltage is fed into a plurality of networks, each network comparing the resultant voltage with a reference voltage and each network having a variable time constant. The output from each network is the algebraic sum of the resultant voltage from the rectifier and the reference voltage. When a dropout is less than the specified depth and/or width, the output will hold a thyratron tube in a cutoff condition, however, when the dropout exceeds the specified depth and/or width the algebraic sum of these two voltages changes sufficiently to allow the thyratron tube to conduct. The specified depths and/or widths are set by merely selecting the proper reference voltages and time constant within each network. When a thyratron tube is in a state of conduction its output is utilized to light a bulb thus indicating a particular dropout and various relays and/or reset buttons are utilized to reset the thyratron tubes for receiving another dropout. The advantages of the present invention are (1) the indicating action is fast allowing oxide damage of extremely narrow width to be detected, (2) a wide range of dropout widths or depths may be measured, (3) relatively inexpensive, (4) provides a positive indication method which can be used to control the action of a tape recorder or other electrical devices, and (5) easily adaptable to various numbers of channels.

An object of the present invention is to provide a device which will more efficiently determine defects on a recording media.

Another object is to provide a device which will determine dropouts of a plurality of specified depths and/or widths on a magnetic recording media.

A further object is to provide a device which will determine defects in an oxide layer on magnetic record media which defects are of extremely narrow widths.

Still another object is to provide a device which is simple of construction and inexpensive to manufacture.

Other objects and many of the attendant advantages of this invention will be readily appreciated as the same becomes better understood by reference to the following detailed description when considered in connection with the accompanying drawings in which like reference numerals designate like parts throughout the figures thereof and wherein the drawing is a schematic representation of the circuitry which is employed in the test apparatus.

Referring now to the drawing wherein reference numerals designate like or corresponding parts there is shown in the figure two identical channels, namely, channel No. 1 and channel No. 2, each channel being responsive to a playback signal at a terminal 10 and the playback signal being picked off from a magnetic recording media by a recording head (not shown). Since the channels are identical the description will be primarily directed toward channel No. 1 for purposes of simplification. The playback signal represents a known A.C. signal which has been continuously recorded on the media and which is now played back and analyzed for dropouts. After analysis the signal on the media will of course be erased and then if the media meets specifications it will be ready for use.

The playback signal is fed to an input potentiometer 12 via a calibrate-operate switch 14 after which the signal is amplified by an amplifier circuit 15 including triode tubes 16 and 18. The output of tube 18 is fed to a voltage doubling rectifier circuit 19 via a capacitor 20, the rectifier circuit including diodes 22 and 24, an ammeter 26 and a capacitor 28. The signal received by the rectifier circuit is fully rectified by tubes 22 and 24 and is changed into a substantially uniform resultant voltage by the action of capacitor 28. The resultant voltage from the rectifier circuit is fed at point 30 into two separate networks, the upper network feeding a thyratron tube 32 and the lower network feeding a thyratron tube 34.

Each of the networks receives a reference voltage from a potentiometer 36 the upper network receiving a reference voltage at point 38 via a resistor 40 and a variable resistor 42 and the lower network receiving a reference voltage at point 44 via a resistor 46. The resultant voltage from the rectifier circuit is fed via resistors 48 and 50 of equal value to points 38 and 44 where it is compared with the reference voltage within each network.

The thyratron tube 32 is responsive via resistor 52 and one of the capacitors 54, 56 or 58 to the sum of the resultant voltage as modified by resistor 48 and the reference voltage at point 38, a switch 60 determining which capacitor will be in the network. The thyratron tube 34 is responsive via a resistor 62 and one of the capacitors 64, 66 or 68 to the sum of the resultant voltage, as modified by resistor 50, and the reference voltage at point 44, a switch 70 determining which capacitor will be in the lower network. The capacitors to the left of capacitor 54 and capacitor 64 respectively are progressively of a larger capacity so that when the switch 60 or 70 is turned in a counterclockwise direction the time constant within each network is increased thereby making either network responsive to wider dropouts on the tape. If the switch 60 or 70 is turned all the way clockwise to terminal 71 in the upper network or terminal 72 in the lower network respectively the capacity of the particular network is reduced essentially to zero, thus reducing the time constant thereof likewise to zero.

The output of thyratron tube 32 of channel No. 1 is coupled to the output of the thyratron tube 32 of channel No. 2 and each output is fed to a solenoid 73. When there is an output from the tube 32 of either channel the solenoid 73 will be energized to close a switch 74, the closing of the switch 74 causing an indicator light 76 to be lit so as to indicate a particular dropout in the tape. If the upper network is set so that the thyratron tube 32 fires only when the media has a dropout which would render it unsuitable for its intended function then a switch 77, also actuated by the solenoid 73, may be used to stop the tape so that the location of the dropout will be indicated.

The output of the thyratron tube 34 of channel No. 1 is connected to a solenoid 78, this solenoid when energized closing a switch 80 and a switch 82. When switch 80 is closed a bulb 84 is lit thus indicating a dropout, by the lower network of channel No. 1, the depth and width of this dropout being dependent upon the reference voltage and the time constant of the lower network. When switch 82 is closed a solenoid 84 is energized, causing a switch 86 to go to an open position and a switch 88 to go to a closed position. When switch 86 is in the open position the power source to the cathode circuit of the tube 34 in the lower network of each channel is broken so that the tube 34 is caused to be nonconductive, thus returning the tube to a normal state. When returned to such a state there is no longer an output from the tube 34 so that solenoid 84 will be de-energized causing switch 86 to go to a closed position thereby readying the tube 34 for a succeeding dropout that may occur in the lower network. In a like manner switch 88 is in an open position when tube 34 is nonconductive and is in a closed position when the tube is conductive, the switch 88 when closed causing a pulse at a counter pulse terminal 90. The pulse at the terminal 90 is utilized by any suitable counter (not shown). A solenoid 92, a switch 94, a switch 96 and a bulb 98 operate in the same manner as solenoid 78, switch 80, switch 82 and bulb 84 respectively, the former group receiving an output from tube 34 of channel No. 2 so as to light the bulb 98 and reset the tube 34 by action through switch 86.

In order to reset the tube 32 of either channel after the tube has been fired, a switch 100 must be opened so as to cut off the power supply in the cathode circuit and return the tube to a nonconductive state. If the automatic reset feature of switch 86 for tube 34 of each channel is not desired a switch 102 is opened thereby opening the circuit to the solenoid 84, this open condition also stopping pulses at the terminal 90. To reset tube 34 of either channel when the automatic reset switch 102 is in an open position the reset switch 100 must be placed in an open position when it is desired to break the cathode circuit of either tube.

Ganged together are a switch 104 and a switch 106 for breaking the power supply in the cathode circuit of tubes 34 and 32, respectively, of channel No. 1. Also ganged together are a switch 108 and a switch 110 for breaking the power supply in the cathode circuit of tubes 32 and 34, respectively, of channel No. 2.

A calibrate oscillator 111 composed primarily of capacitors 112 and 114, an inductance 116, and triodes 118 and 120 is used for calibrating both channel No. 1 and channel No. 2 when the switch 14 is turned to a calibrate terminal 122. A potentiometer 124 is used to control the potential of the grid of the tube 118 and a switch 126 is used to break the power to the calibrate oscillator.

A power circuit 127 receiving a power source at terminals 128 and 130 is primarily composed of a triple secondary transformer 132, tube 134, capacitors 136 and 138 and tubes 140 and 142. The upper secondary of transformer 132 delivers power to the bulbs 84 and 98 and also power to the heaters of the tubes. The middle secondary is tapped so as to deliver power to the plate circuits of all tubes.

In the operation of the device channel No. 1 and channel No. 2 are calibrated by first closing switch 126 and turning the operate calibrate switch 14 to terminal 122. The input potentiometer 12 is then placed approximately in a center position after which the potentiometer 124 in the grid circuit of tube 118 is adjusted until a reading of 400 microamperes is indicated on the meter 26 in the cathode circuit of tube 22. The voltage at the operate calibrate switch 14 is then measured with an A.C. vacuum tube voltmeter and set at any desired dropout level (such as 5 db) below the reference level previously set by re-adjusting the potentiometer 124. The potentiometer 36 is then adjusted until the thyratron tubes 32 and 34 just fire or ionize, this establishing the dropout level on the recording media at which the device will react. This level can be adjusted to any desired range by adjusting the potentiometers 124 and 36. The reading on the meter 26 is now the dropout level rating and should be recorded for any future instrument checks.

After a channel is calibrated the reference signal at point 44 in the lower network is established, however, the reference level in the upper network can be varied by adjusting potentiometer 42, the level of either reference signal determining the dropout level that will be detected by the corresponding network. The dropout width that will be detected by either network is determined by the amount of capacitance introduced into the networks by the switches 60 and 70, the movement of the switches counterclockwise introducing a larger capacitance and thereby causing the networks to detect dropouts of greater widths. While only three capacitors are shown for each network, it is conceivable that a multicontact switch could be used with many switchable widths.

In the normal operation of a device each network within a particular channel will be set to detect a dropout having a selected depth and width. Accordingly, the lower network of a channel may be set by switch 70 and potentiometer 36 to detect a dropout having a maximum width and a selected depth and the upper network may be set by the potentiometer 36 and the potentiometer 44 and the switch 60 to detect a dropout having a maximum depth and a selected width. When either network detects a dropout, for which it is set, a respective thyratron tube will fire and will actuate various relays or bulbs as previously described. It is readily apparent that a wide range of dropout tolerances can be detected by varying the reference level at points 38 and 44 and by varying the capacitance through switches 60 and 70. Since the thyratron tubes, because of their inherent nature, have an ionization time of approximately one microsecond the time constant of either network can be set for that time by turning switches 60 or 70, in channel 1 to terminals 71 or 72 respectively. This enables either network to be responsive to very narrow width dropouts in the order of 1 microsecond.

It is now readily apparent that the present invention provides a simple and inexpensive device which will more efficiently determine a plurailty of specified dropouts on a recording media. By utilizing thyratron tubes which have an ionization time as low as 1 microsecond the widths that can be detected by the device are brought down to an extremely narrow width by setting the time constant in either network to zero. By utilizing a plurality of networks within each channel for analyzing dropouts having various widths and/or depths the capability of a device is greatly enhanced.

Obviously many modifications and variations of the present invention are possible in the light of the above teachings. It is therefore to be understood, that within the scope of the appended claim, the invention may be practiced otherwise than as specifically described.

I claim:

In a magnetic recording media tester which analyzes a playback signal from the media to determine different dropout conditions within the signal, each condition representing a specified depth with respect to the signal level and width with respect to time; means for amplifying the playback signal, means responsive to the amplifying means for rectifying the playback signal into a uniform level voltage, means for producing a plurality of reference signals, means for summing the rectified playback signal with each of the reference signals so as to produce a plurality of resultant signals, a thyratron tube responsive to each resultant signal and biased thereby in an off condition when the playback signal is at a normal level, each thyratron tube having a firing level of a particular depth below the normal level of the resultant signal, the depth of the firing level being a function of one of the specified depths, means for adjusting the level of each reference signal so that the firing level of each thyratron tube can be varied, a network having an adjustable time constant between the summing means and each thyratron tube for delaying the rate of change of each resultant signal according to a function of one of the dropout conditions so that a thyratron tube will fire upon the occurrence of one of the dropout conditions, means responsive to at least one of the outputs of the thyratron tube for returning the tube when fired to an off condition so that the tube is continuously readied for a succeeding dropout and means responsive to the thyratron tubes for indicating when the tubes are being fired whereby the different dropout conditions are determined.

References Cited by the Examiner

UNITED STATES PATENTS

| | | | |
|---|---|---|---|
| 2,540,654 | 2/51 | Cohen | 324—34 |
| 2,793,344 | 5/57 | Reynolds | 324—34 |
| 2,854,624 | 9/58 | Lubkin | 324—34 |
| 2,922,106 | 1/60 | Oates | 324—34 |

WALTER L. CARLSON, *Primary Examiner.*